Oct. 20, 1936. W. H. MASON 2,058,333
APPARATUS FOR MAKING CORRUGATED VEGETABLE-FIBER BOARD
Filed June 30, 1933 3 Sheets-Sheet 3
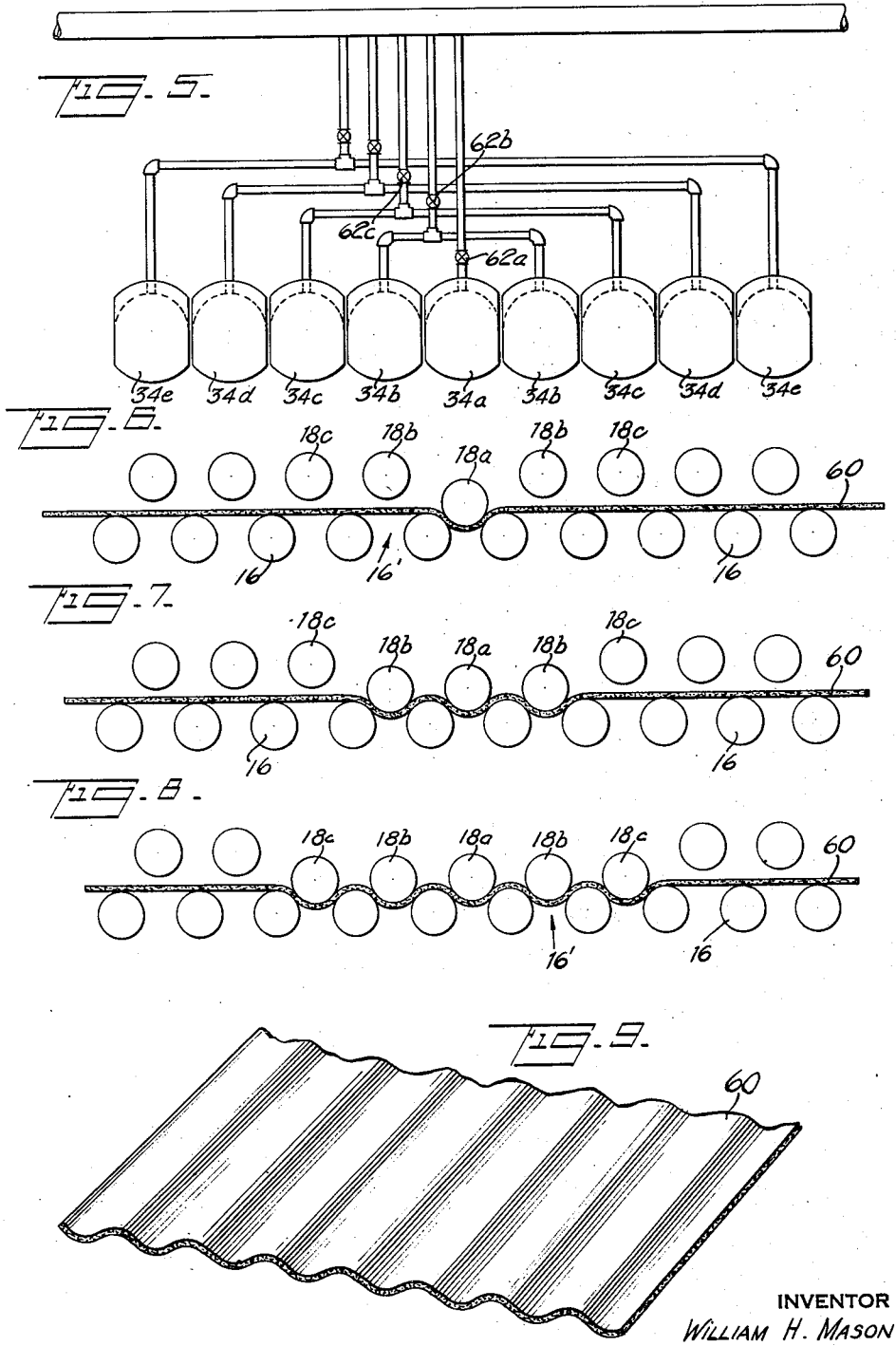
INVENTOR
WILLIAM H. MASON.
BY
Dyke and Schaines
ATTORNEYS.

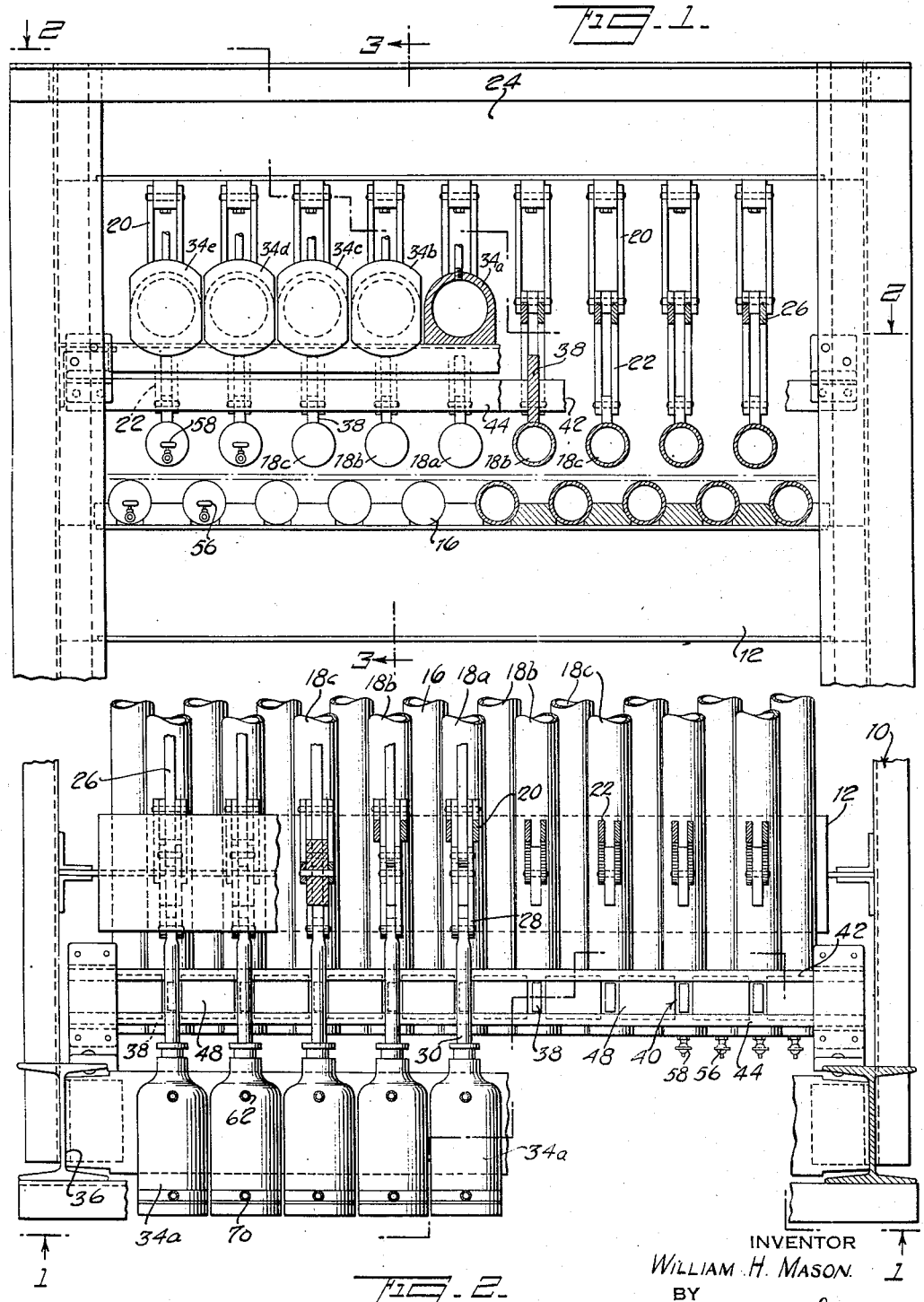

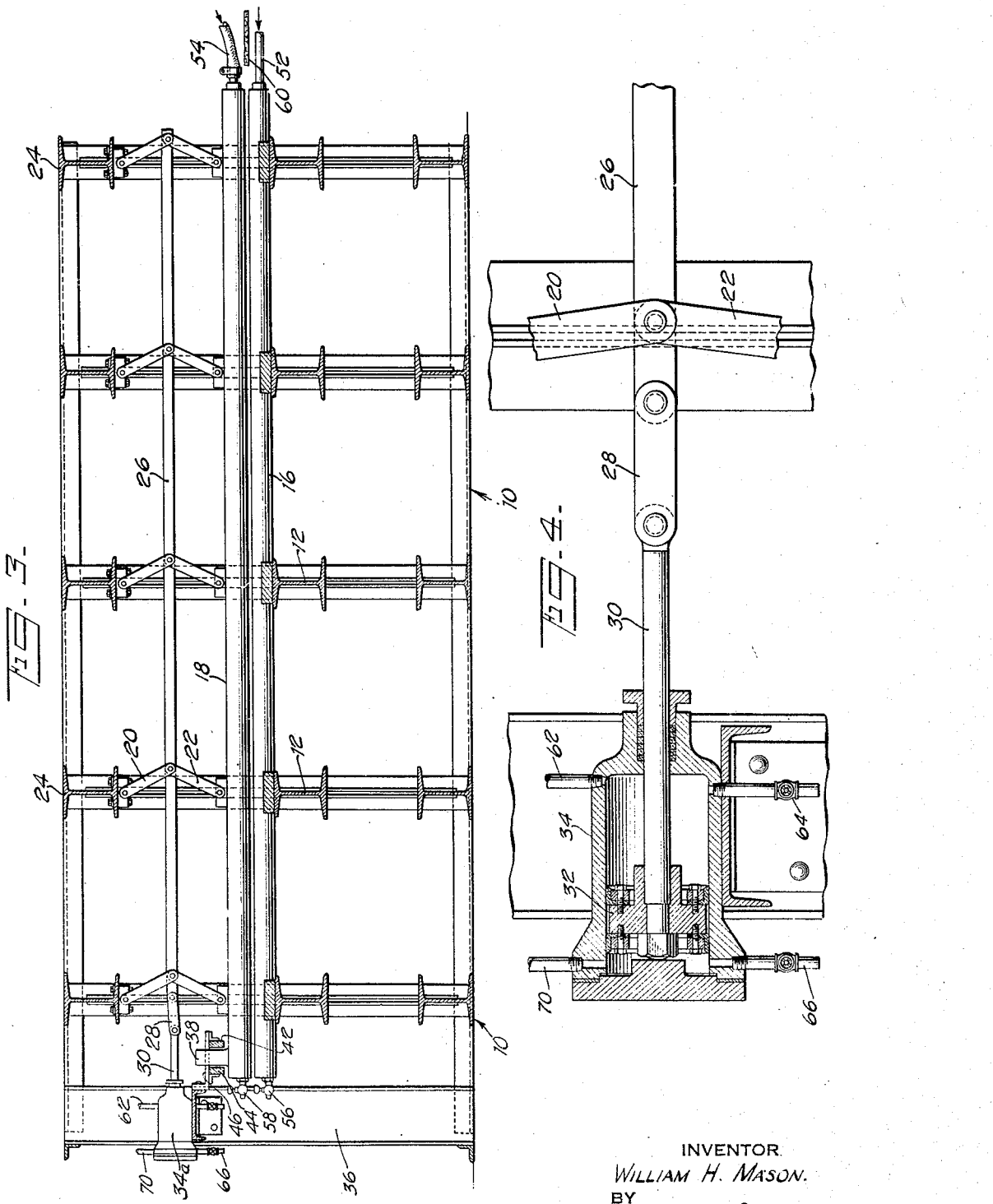

Patented Oct. 20, 1936

2,058,333

UNITED STATES PATENT OFFICE 2,058,333

APPARATUS FOR MAKING CORRUGATED VEGETABLE-FIBER BOARD

William H. Mason, Laurel, Miss., assignor to Masonite Corporation, Laurel, Miss., a corporation of Delaware Application June 30, 1933, Serial No. 678,401

5 Claims. (Cl. 154—30)

My invention relates to the making of corrugated vegetable-fiber board, and has for its principal object the provision of an apparatus for converting flat sheets of vegetable-fiber board into sheets with permanent corrugations. Other objects are obvious or appear in connection with the following description of preferred embodiments.

In the accompanying drawings forming a part of this specification:

Figure 1 is a part end view and part transverse sectional view of one form of apparatus constructed according to and embodying my invention;

Fig. 2 is a part plan view and part horizontal sectional view thereof, the sectional parts being taken substantially on the broken line 2—2 of Fig. 1;

Fig. 3 is a longitudinal sectional view taken substantially on the line 3—3 of Fig. 1;

Fig. 4 is a detail sectional view of actuating mechanism including toggles and hydraulic cylinders;

Fig. 5 is a schematic view of pipe connections and valving for controlling the admission of fluid to the hydraulic cylinders;

Figs. 6, 7 and 8 are diagrammatical sectional views to illustrate stages in the pressing operation.

Fig. 9 is a perspective view of a piece of the completed corrugated board.

The apparatus shown constitutes a simple form of hot pressing apparatus adapted for the carrying out of my invention, having a framework 10 with cross beams 12 for fixedly supporting the bed of the corrugating hot press, which in the form shown consists of a series of hollow cylinders or pipes 16 arranged in parallel, and made of diameter and spacings dependent on the corrugation height and transverse spacings desired for the board, and which for a board of ⅛" thickness may desirably be in the neighborhood of 1 inch height of corrugation and 5 inch spacings between centers.

The movable press members also preferably consist of cylinders or pipes 18, located centrally over the openings 16' between the press-bed pipes 16, and mounted to have forcible movement toward and away from the bed pipes 16, as for example, individually carried by means of several pairs of toggle arms 20—22, which arms are pivoted at their respective ends to the pipes 18 and to thrust beams 24 of the machine frame 10.

Actuation of the toggle arms and pipe 18 carried thereby may be by link members 26, common to all the toggles attached to each length of pipe, connecting rod 28, piston rod 30 and piston 32 of hydraulic cylinders 34, which are rigidly supported, preferably in an end section 36 of the machine frame 10.

The movement of pipes 18 is confined to movement to and away from the pipes 16, and they are restrained from lateral and endwise movement relative thereto. Such confinement may be secured by any suitable means, such as by providing each pipe 18 with vertical studs or standards 38 that work in openings or passages 40 provided between guide bars 42, 44 fastened in place in the machine frame as indicated at 46, and also between guide blocks 48 connecting the guide bars 42, 44. Such means or equivalent is shown at one end of the movable pipes 18 only, but may be duplicated at each end of the pipes, if desired. The movable pipes 18 are further guided by being received in the recesses 16' between the fixed pipes 16. As will be obvious the full pressure exerted on the board becomes available substantially immediately upon engagement of the board by each one of the movable pipes.

The heating fluid, as steam, that is supplied to the press pipes 16, 18 may be supplied to the fixed press-bed pipes 16 by the rigid pipe 52, and to the movable pipes 18 by the flexible piping 54, or hinged steam piping may be used, and preferably valved connections 56—58 are provided for permitting a return circulation of the heating fluid, or same may be draw-off cocks for permitting escape of condensed steam.

In operation, the flat blank sheet 60 of vegetable-fiber that is to be corrugated (having been previously wet and otherwise prepared for treatment in manner hereinafter described), is inserted in place between the bed pipes 16 and the movable pipes 18, the latter having been raised to permit such insertion. The central press cylinder or pipe 18—a is then forcibly depressed as by admission of oil or other fluid under pressure at 62 to the central one, 34—a, of the hydraulic cylinders 34, this being accomplished, for example, by opening supply cock 62—a for this purpose, together with respectively closing and opening the discharge cocks 64 and 66 for such cylinder. The supply cock 62—a, as well as the other like supply cocks for the other cylinders to be referred to, after being opened, are left open during the pressing operation so that the pressure is maintained and followed up during drying.

The movable pipes or cylinders 18b—18b, adjacent to the central pipe 18—a and on each side thereof, are then forcibly depressed, as by supplying actuating fluid to the hydraulic pressure cylinders by means of supply cock 62b, which, as shown in Fig. 5, communicates with the two corresponding cylinders 34—b, 34—b. Extra width of material needed to make the curved section is thus supplied from each side inwardly while the center of the sheet is rigidly clamped.

This operation progresses continuously, from the central portion of the sheet being pressed toward each edge thereof, as by cock 62—c being opened to supply actuating fluid to the cylinders 34—c, 34—c, thereby depressing press pipes 18—c, 18—c, and so on seriatim, press cylinders 34—d, 34—d being next operated so that pipes 18d, 18d are depressed, and finally the outer pair 34—e, 34—e.

Figure 6 shows the central press pipe or cylinder 18—a depressed. Figure 7 shows same remaining depressed and with the adjacent press cylinders 18—b, 18—b depressed, and Figure 8 shows how this progressive pressing operation proceeds, the next adjacent pair of press pipes 18—c, 18—c being also depressed. It will be understood that series-operated valves, capable of rapid automatic actuation, can be used instead of the manual valves, which are illustrated and described for affording a simple disclosure and clear understanding of the invention and how it may be carried out.

The open character of the press platens consisting of the bed pipe 16 and movable press pipes 18 favors the rapid drying of the initially wet blank being operated on, the steam formed escaping freely through the board without the restraint that would be encountered with solid continuous platens. When the corrugated board is dry, the corrugated sheet, which is of substantially the original length, but of somewhat reduced overall width, is released by raising all the movable pipes 18 together, as by means of opening cocks to a supply inlet 70, which may be common to all the cylinders 34 of the series, outlet valves 66 having been closed, outlet valves 64 opened, and supply valves 62 closed. This elevates the movable press cylinders or pipes 18, and the finished board can be removed.

The apparatus described can be made use of with materials of various kinds having sufficient plasticity when wet and becoming rigid upon being dried out.

The preferred blanks to be used are flat sheets of the hard, stiff, dense and strong composition board of my Patent No. 1,663,505, made from the wood or woody constituents of fibrous vegetable material, such as so-called soft wood or hard wood of trees, or of vegetable growths of various kinds, including bamboo, cane and other wood forming grasses, and the like, reduced to fiber in a manner to retain sufficient of the non-cellulose constituents of the fiber to make it self-bonding; and a wet-lap of the fiber, preferably having about 2% of waterproofing petrolatum size incorporated, dried under heat and consolidating pressure, followed up as shrinkage proceeds, and with a wire screen in place between the wet-lap and a press platen. Such boards of specific gravity about one, or more than one, are well adapted for use with my invention, being adapted to become moist to the extent of absorbing about 25 to 30% of water on soaking in water for twenty-four hours, and which moisture can be readily dried out by application of heat in a press embodying my invention.

I claim:

1. Apparatus for hot pressing of wet sheets of vegetable fiber into corrugated state comprising a set of parallel spaced-apart interiorly heated pipes, and interiorly heated pipes opposite the spaces between the pipes of said set, means for producing pressing engagement of certain of the last-named pipes with certain of the pipes of the set at about the center of said set with a vegetable fiber sheet therebetween, and means for then producing like pressing engagement of certain of said last-named pipes with pipes of the set simultaneously at each side of the center thereof, whereby pressure is applied to said sheet from the median portion thereof simultaneously outwardly toward each edge.

2. In a press for corrugating and drying sheets of vegetable fiber board, a set of interiorly heated, spaced-apart parallel pipes adapted to be engaged by the board on one side thereof, interiorly heated pipes at the other side of the board, and said pipes being movable relative to the pipes of said set, and means for producing movement of the last-named pipes into pressure engagement with board at the regions opposite the spaces between the pipes of said set.

3. Apparatus as in claim 2 wherein the first named set of pipes is stationary and the other pipes movable.

4. Apparatus as in claim 2, and in which the therein-described means comprises extensible and contractable toggle arms.

5. Apparatus as in claim 2 wherein the pressure engagement producing means are brought into operation progressively from a median line outwardly toward the edges of the board.

WILLIAM H. MASON.